United States Patent
Poudrette et al.

(10) Patent No.: US 7,691,170 B2
(45) Date of Patent: Apr. 6, 2010

(54) PROCESS AND DEVICE FOR TREATING RAW MANURE

(75) Inventors: Florian Poudrette, Mont St-Hilaire (CA); Alexandre Poudrette, Ste-Madeleine (CA); Gaetan Gauthier, Ste-Foy (CA); Danielle Bégin, legal representative, Ste-Foy (CA)

(73) Assignee: Carriere R. Poudrette Inc. (CA)

( * ) Notice: Subject to any disclaimer, the term of this patent is extended or adjusted under 35 U.S.C. 154(b) by 1240 days.

(21) Appl. No.: 11/155,192

(22) Filed: Jun. 17, 2005

(65) Prior Publication Data

US 2006/0021407 A1   Feb. 2, 2006

Related U.S. Application Data

(63) Continuation-in-part of application No. PCT/CA03/01971, filed on Dec. 18, 2003.

(60) Provisional application No. 60/434,393, filed on Dec. 19, 2002.

(51) Int. Cl.
C05F 3/00 (2006.01)
C05F 3/06 (2006.01)

(52) U.S. Cl. .................... 71/21; 71/64.1; 210/196; 210/767; 210/805

(58) Field of Classification Search .................. 71/21, 71/64.1; 210/805, 767
See application file for complete search history.

(56) References Cited

U.S. PATENT DOCUMENTS

| | | | |
|---|---|---|---|
| 3,773,659 A * | 11/1973 | Carlson et al. ............... 210/606 |
| 4,193,206 A | 3/1980 | Maffet |
| 4,270,279 A | 6/1981 | Roediger |
| 4,295,972 A | 10/1981 | Kamei |
| 4,342,650 A | 8/1982 | Erickson et al. |
| 4,559,073 A | 12/1985 | Minato et al. |
| 5,013,458 A | 5/1991 | Christy et al. |
| 5,593,590 A | 1/1997 | Steyskal |
| 5,885,461 A | 3/1999 | Tétrault et al. |
| 6,387,267 B1 | 5/2002 | Kantardjieff |
| 6,409,788 B1 | 6/2002 | Sower |
| 6,497,741 B2 | 12/2002 | Sower |
| 6,692,642 B2 * | 2/2004 | Josse et al. ............... 210/605 |
| 6,916,426 B2 * | 7/2005 | Van Slyke et al. .......... 210/666 |
| 7,371,328 B1 * | 5/2008 | Hokanson et al. .......... 210/710 |
| 7,410,589 B2 * | 8/2008 | Lakshman ................. 210/718 |
| 2002/0096477 A1 | 7/2002 | Almela |
| 2002/0158024 A1 | 10/2002 | Van Slyke et al. |
| 2004/0254319 A1 | 12/2004 | Ameduri et al. |

(Continued)

FOREIGN PATENT DOCUMENTS

DE   101 53 806   5/2003

(Continued)

Primary Examiner—Wayne Langel
(74) Attorney, Agent, or Firm—Cantor Colburn LLP

(57) ABSTRACT

A process and a device for treating and upgrading raw manure. The method and the device comprise steps which consist in promoting agglomeration of solid constituents of the manure and precipitating the agglomerated particles by using a sedimentation agent. More particularly, the sedimentation agent used is based on natural stone and/or industrial derivative dusts. Sedimentation of the agglomerated particles enables the solid phase and the liquid phase to be separately treated, leading eventually to the production of a solid fertilizer, a liquid fertilizer and water corresponding to environmental standards and capable of being released into the environment or simply recycled.

16 Claims, 1 Drawing Sheet

U.S. PATENT DOCUMENTS

2006/0283221 A1 * 12/2006 Camisa .................. 71/21

FOREIGN PATENT DOCUMENTS

| DE | 101 54 165 | 5/2003 |
| --- | --- | --- |
| JP | 63049292 | 3/1988 |
| JP | 09194394 | 7/1997 |
| JP | 10251046 | 9/1998 |
| WO | WO 94/20436 | 9/1994 |

* cited by examiner

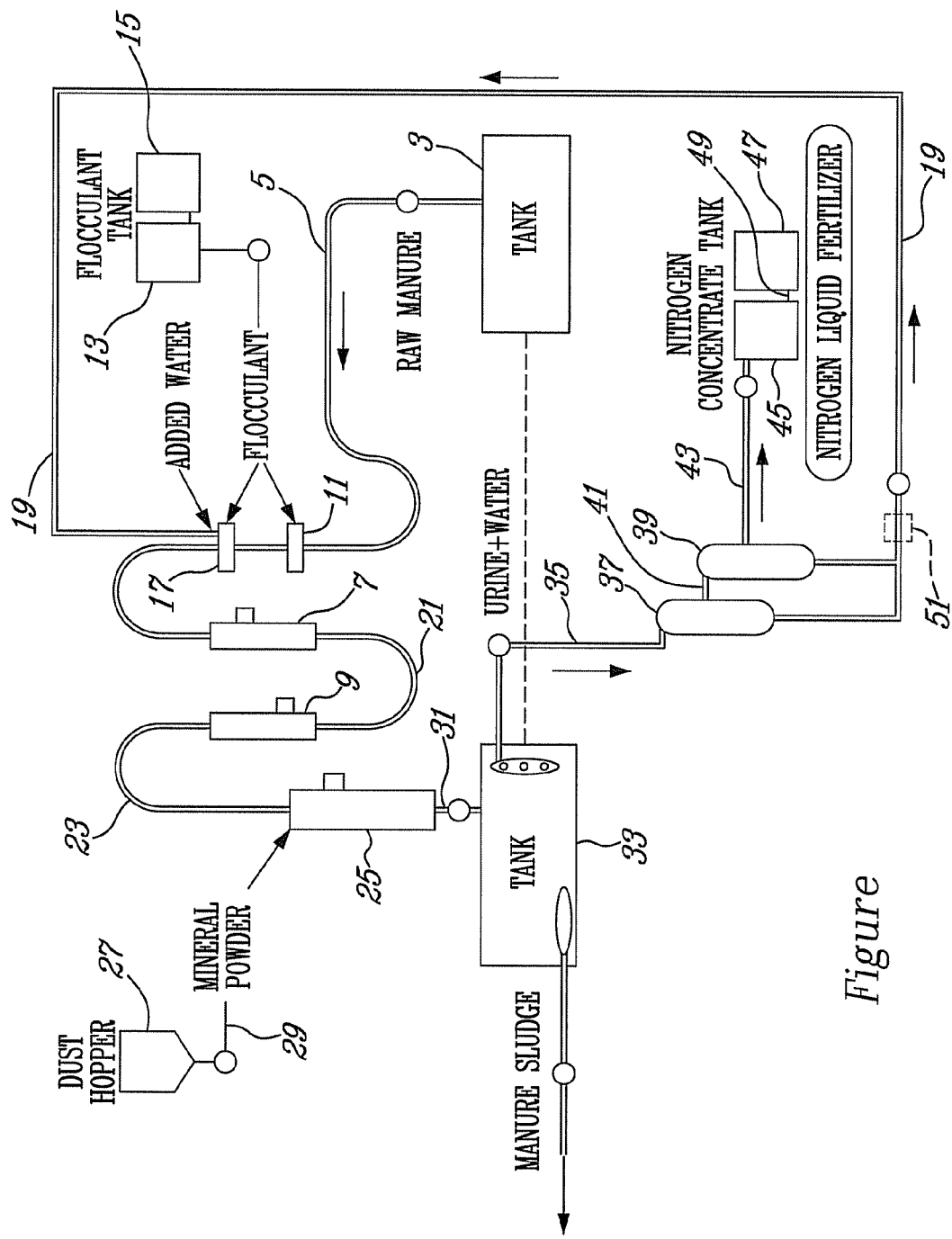
Figure

PROCESS AND DEVICE FOR TREATING RAW MANURE

CROSS-REFERENCE TO RELATED APPLICATIONS

This application is a continuation-in-part of PCT patent application serial number PCT/CA2003/001971 filed Dec. 18, 2003 designating the United States and which claims the priority of U.S. provisional patent application 60/434,393 filed on Dec. 19, 2002, both of which applications are herein incorporated by reference.

BACKGROUND OF THE INVENTION

1) Field of the Invention

The present invention relates to a process and a device for treating raw manure in order to produce a solid fertilizer, a liquid fertilizer, and water that possibly complies with environmental standards and can be safely returned to the environment or simply be recycled. In particular, the process and the device are adapted for the separation and the separate treatment of the liquid and solid components of pig manure, by utilizing natural stone and/or industrial derivative dust, as sedimentation agent for the colloidal particles of manure. In addition to upgrading manure, these process and device allow for an upgrading of residues from stone quarries.

2) Description of the Prior Art

The establishment of large hog farms causes increasing problems with respect to the management of pig manure. Conventionally, pig breeders get rid of pig manure by scattering it on agricultural lands. Although this solution is economical, it creates increasing problems, such as contamination of the air caused by bad odors, subterranean water and water sources contamination, as well as soil contamination due to the large quantities of waste. To overcome these problems, farmers rely more and more on transportation of manure by trucks in order to have far away lands at their disposal. This situation however leads to disadvantages, such as an increase in the cost associated with scattering and the difficulties resulting from transporting a liquid material.

Instead of wasting time in selecting a way to get rid of manure, investigators have concentrated on the modes of treating manure. Among those, bio-filtration by means of biological materials such as peat moss or straw should be mentioned. This method has the advantage that it does not cause secondary pollution, allows a reduction of the odors by 60% to 80% and is a technology that is not expensive and easy to install, because it can be used in restricted size areas. However, bio-filters should be replaced periodically and provide no upgrading of the organic matter. Another strategy aiming at adding additives to manure causes a reduction of the odors, from 70% to 85%, a reduction of the solid matter and a reduction of ammonia. The additives used may be masking agents, chemical agents capable of absorbing odors or also biological agents. In addition to being costly, the results obtained by using this strategy are to this day moderate.

The addition of additives to pig's feed constitutes an alternative to reduce odors and the quantities of ammonia in pig manure. As a matter of fact, agents such as amino acids, zeolites, coal, plant extracts, enzymes, microbes or salts may be added to the feed in order to improve food conversion and pig growth performances. This technology is however also costly and the efficiency of this method is not unanimous in commercial markets. Other breeders elect simply to cover their manure sump with covers of different nature, thereby preventing the emission of bad odors, while others elect to provide biological tree barriers around their installations, thus preventing bad odors from being spread around.

The prior art also describes processes that aim at separating the solid and liquid components that are present in pig manure. The U.S. Patent published under U.S. Pat. No. 4,193,206 describes a process for drying manure and filtering water. This process requires thermal drying or mechanical dehydration in a cylindrical chamber provided with porous walls. The U.S. Patent published under U.S. Pat. No. 4,270,279 describes a method for drying and sterilizing contaminated sludge by drying and fragmenting it into small pieces. The U.S. Patent published under U.S. Pat. No. 4,295,972, for its part, describes a method for treating water containing pollutants. This method comprises among others a step in which calcium oxide is added to contaminated water for a preliminary drying and the compound obtained is converted into granules. The U.S. Patent published under U.S. Pat. No. 5,013,458 describes a process and an apparatus allowing a reduction of pathogens and waste. This method includes a hydration step that is carried out by raising the pH of the waste sludge, allowing heat to be released. The U.S. Patent published under U.S. Pat. No. 5,885,461 describes a process and a system aiming at treating manures of domestic animals such as pigs, comprising the steps of compressing manure to separate liquids and solids, and drying the contaminated sludge. The addition of calcium carbonate causes a reduction of bad odors and the addition of polymers during the step of compressing sludge helps to separate the liquid that is present in the sludge. The liquid obtained is thereafter treated with a filtering membrane which makes it possible to remove undesirable elements from the liquid. The filtered liquid is possibly returned to the environment.

Although the latter process has interesting characteristics, the separation of the solid and liquid components that are present in manure requires an additional mechanical step that involves additional energy cost. Moreover, no method is provided for the addition of a precipitating agent to cause the separation of the solid and liquid components of manure in order to separately treat these two phases.

U.S. Pat. No. 6,409,788 recommends the use of a flocculating agent and chemical products that helps to precipitate phosphates, said flocculating agent and chemical products being associated with a base and an ammonia retention agent. We are therefore concerned with an expensive process that is limited to the separation of phosphates and the formation of a very impure liquid phase.

It would therefore be interesting to have at one's disposal a process permitting to treat raw manure and to upgrade quarry residues, which could be used as an agent for precipitating solid particles.

SUMMARY OF THE INVENTION

The invention provides a process for treating raw manure in order to produce a solid fertilizer, a liquid fertilizer and water that can be recycled. The process comprises the following steps: a flocculating agent capable of forming flocks containing the solid components of manure is added to a quantity of raw manure; to the product obtained by combining raw manure and the flocculating agent, there is added a sedimentation agent based on dusts derived from natural stones and/or industrial derivatives to help in thickening the mixture and produce a solid phase and a liquid phase; the liquid phase and the solid phase are separated; the liquid phase is filtered in a manner to produce on the one hand a concentrate containing substantially all the nitrogenous compounds of manure and on the other hand a filtrate constituting recyclable water; the concentrate of nitrogenous compounds constituting the liquid fertilizer is collected; the solid phase obtained from manure is dehydrated under conditions allowing to minimize the water content between 10 and 60% by weight; and the dehydrated solid phase is agglomerated in order to obtain balls constituting the solid fertilizer.

The raw manure usually contains between 1 and 10%, preferably 4% by weight of solid material on dry basis with respect to the weight of the raw manure.

The flocculating agent that is normally used is a cationic flocculant, such as a polyacrylamide which is preferably cationic, for example a product selected from the group comprising NALCO7191, NALCO7193, NALCO7194, NALCO7196, CYTEC2085, and CHEMAX2746.

The flocculating agent may be used in any form that is acceptable to the man of the art, but preferably it is in the form of an emulsion comprising between 0.1 and 0.5%, preferably 0.35% by weight of flocculating agent. Between 5 to 30%, more particularly 10% by weight of emulsion with respect to the weight of the manure to be treated is normally added.

Before adding the sedimentation agent, it is recommended to add water to the manure to which a flocculating agent has been added, for example between 50 and 400%, preferably between 100 and 120% by weight with respect to the weight of the manure to be treated. Part of the water added to the manure to be treated normally consists of the filtrate obtained during the treatment.

According to preferred characteristic of the invention, the product obtained after adding the flocculating agent, is allowed to pass in at least one, preferably three stationary mixers before adding the sedimentation agent, and the mixture obtained is thereafter transferred into a tank where the sedimentation agent will be added.

The sedimentation agent comprises for example a natural stone dust selected from the group consisting of hornfels, syenite, shale, limestone, and/or dolomite stones. Excellent results were obtained when using hornfels stone dust.

The quantity of sedimentation agent may vary depending on the choice of the man of the art, however it is preferred to add between 0.5 and 15%, for example 10% by weight thereof with respect to the weight of manure.

Solid phase liquid phase separation is preferably carried out by decanting.

The filtration used to separate the filtrate from the concentrate is preferably a membranous filtration. For example, it is possible to select a type of filtration that extends from micro-, ultra- and nanofiltration up to reverse osmosis. For better results, membranous filtration is followed by filtration on activated carbon.

According to another embodiment, when balling, a certain quantity of sedimentation agent is added before obtaining balls.

Although any binding agent can be used, one that is preferred according to the present invention is lignosulfonate. Bentonite or sodium silicate could also be used.

The present invention also provides a device for treating manure and intended to provide a solid fertilizer, a liquid fertilizer and recyclable water. This device comprises: a manure tank; a source of flocculating agent, and means allowing to introduce said flocculating agent into the manure, under conditions allowing to combine the solid components of the manure; a source of sedimentation agent for the solid components of the manure and means for adding said agent to the medium containing said solid components, and produce a solid phase and a liquid phase; means for separating the solid phase from the liquid phase; membranous filtrating means for treating the liquid phase and provide on the one hand a concentrate containing nitrogenous compounds, and on the other hand a filtrate; means for recycling the filtrate to the manure to which a flocculent has been added; means for dehydrating the solid phase to a water content varying between 10 and 60% by weight with respect to the weight of the manure to be treated; and agglomeration means to provide balls constituting the solid fertilizer.

The device may also comprise means for recycling the filtrate to the manure to which a flocculating agent has been added.

The agglomeration means may comprise a cold stirring means with addition of a binding agent.

The invention further provides a process for treating raw manure for the production of a solid fertilizer, a liquid fertilizer and recyclable water. The process comprises the following steps: a flocculating agent capable of forming flocks containing the solid components of manure is added to a quantity of raw manure; to the raw manure, there is added a sedimentation agent based on dusts derived from natural stones and/or industrial derivatives to help in thickening the manure and produce a solid phase and a liquid phase; the liquid phase and the solid phase are separated; the liquid phase is filtered in a manner to produce on the one hand a concentrate containing substantially all the nitrogenous compounds of the manure and on the other hand a filtrate; the concentrate of nitrogenous compounds constituting the liquid fertilizer is collected; the solid phase obtained from the manure is dehydrated under conditions allowing to minimize the water content between 10 and 60% by weight; and the dehydrated solid phase is agglomerated in order to obtain balls constituting the solid fertilizer.

It is suggested to add water to manure, for example between 50 to 400%, preferably between 100 and 120% by weight with respect to the weight of the manure to be treated. Part of the water added to the manure to be treated normally consists of the filtrate that is obtained during the treatment.

DETAILED DESCRIPTION OF THE DRAWING

Further features and advantages of the present invention will become apparent from the following detailed description, taken in combination with the appended FIGURE:

a schematic illustration of a device for treating manure that can be used for an embodiment of the treatment of the present invention in which the sedimentation agent is added after the flocculating agent.

It will be noted that throughout the appended figure, like features are identified by like reference numerals.

DETAILED DESCRIPTION OF THE PREFERRED EMBODIMENT

With reference to the drawing given purely by way of illustration and which is a schematic description of an embodiment of a treatment according to the invention, it will be seen that the raw pig manure (or any manure it goes without saying) is collected as known in a raw manure concrete tank 3 and is sent through duct 5 towards three stationary mixers 7, 9 and 25. In this embodiment, mixer 7 is a Wesffall mixer and mixers 9 and 25 are mixers sold by Cold Palmer. One skilled in the art will be in a position to select any other mixer or mixers depending on needs. Along duct 5 and before introducing the raw manure into the three stationary mixers 7, 9 and 25, there is provided an inlet for a flocculation agent into a stationary Westfall mixer 11, in the present case NALCO7191, although any other agent, preferably a cationic polyacrylamide, could also be used. NALCO7191 is stored in flocculant tanks 13 and 15 that are in communication with one another as seen on the schematic illustration.

In this embodiment, the flocculant is present in tanks 13 and 15 in the form of an emulsion comprising 0.35% by weight of NALCO7191. It goes without saying that any other suitable concentration could also be used, for example between 0.1% and 0.5%. Normally, 5 to 30% by weight of emulsion with respect to the weight of the manure to be treated is added. In addition, still along duct 5, there is provided a water inlet into a stationary Westfall mixer 17 connected on the one hand to any kind of source of fresh water and on the other hand to the water obtained in the form of filtrate that is obtained during the treatment and which will be discussed more in detail later, said water being recycled through duct 19 as illustrated in the schematic illustration. The device is adjusted in known manner to introduce into the manure containing a flocculant, between 50 and 400%, preferably between 100 and 120% by weight of water originating from the source mentioned above and from the recycled filtrate.

Again referring to the drawing, it will be realized that the mixture of manure, flocculent and water previously mixed in the stationary mixer 7 is sent towards the second stationary mixer 9 through duct 21. It will also be seen that in last resort, this last mixture is sent through duct 23 towards another stationary Cole Palmer mixer 25, where hornfels stone dust will be added to the mixture.

Obviously any other dust from industrial waste giving the same results could also be used, as this will be obvious to the man of the art. This hornfels stone dust is stored in a powder hopper 27 which is connected to mixer 25 by means of a duct 29. There is provided a means known to the man of the art to control the addition of hornfels stone dust in amounts between 0.5 and 15% by weight, preferably 10% by weight, with respect to the weight of the manure to be treated. While in contact with the sedimentation agent in the form of hornfels stone dust, thickening of the mixture will take place, which is sent into concrete tank 33 through duct 31 where a solid phase and a liquid phase will be formed. From tank 33, the liquid component of manure is separated by decantation (not illustrated on this schematic illustration) and is sent through duct 35 to a filtering system of which details will be given later. The solid phase in the form of a manure sludge is then dried in known manner until it contains only 10 to 60% water. Any other material of interest, such as fertilizers and a certain quantity of hornfels stone dust can thereafter be added, and the whole is agglomerated by cold stirring with a binding agent, for example a lignosulfonate, to obtain balls constituting a chemical fertilizer. These balls, which have a preferred diameter between 50μ and 5 mm, may then be bagged and used as fertilizer with a high content of sodium, potassium and oligo-elements. These last steps are completely conventional and have not been illustrated on the schematic illustration, however it goes without saying that one skilled in the art will know how to adapt them to one's own needs.

As mentioned above, the liquid component of the manure that is separated by decantation is sent towards a filtering system. The latter consists of an ultrafiltration unit 37 and a reverse osmosis filter 39, which are in communication with one another through duct 41. In this system, there is separation between a concentrate containing in practice all the nitrogenous compounds of the manure, said concentrate being sent through duct 43 towards nitrogen concentrate tanks 45 and 47 that are in communication through duct 49.

The filtrate that is rejected by the filtering system is sent in known manner towards an activated carbon filter 51, which can be dispensed with, it goes without saying. The filtrate is then recycled through duct 19, into 17 to be mixed therein to the manure containing the added flocculant.

It goes without saying that this device as well as the process described above are capable of any modifications that are obvious to the man of the art and that the invention is not restricted to the preferred embodiments given purely by way of illustration.

What is claimed is:

1. Process for treating raw manure in order to produce a solid fertilizer, a liquid fertilizer and recyclable water, comprising the following steps:
   adding to a quantity of raw manure, a flocculating agent capable of producing flocks containing solid components of manure and mixing the combined raw manure and flocculating agent;
   adding to the product obtained by combining the raw manure and the flocculating agent, a sedimentation agent in the form of natural stone dust, to produce a separation of the solid phase and a liquid phase by decantation;
   filtering the liquid phase in a manner to produce on the one hand a concentrate containing substantially all the nitrogenous compounds of the manure and on the other hand a filtrate constituting the recyclable water;
   adding the filtrate constituting the recyclable water to the combined raw manure and flocculating agent:
   collecting the concentrate of nitrogenous compounds constituting the liquid fertilizer;
   dehydrating the solid phase obtained from the manure to reduce its water content to a value between 10 and 60% by weight; and
   agglomerating the dehydrated solid phase in order to obtain balls containing the solid fertilizer.

2. Process according to claim 1, characterized in that the dehydrated solid phase is agglomerated by cold stirring with addition of a binding agent.

3. Process according to claim 1, characterized in that the raw manure contains between 1 and 10% by weight of solid matter on dry basis with respect to the weight of the raw manure.

4. Process according to claim 1, characterized in that the flocculating agent is a cationic flocculant.

5. Process according to claim 1, characterized in that the flocculant is in the form of an emulsion comprising between 0.1 and 0.5% by weight of flocculating agent.

6. Process according to claim 5, characterized in that there is added from 5 to 30% by weight of emulsion with respect to the weight of the manure to be treated.

7. Process according to claim 1, characterized in that water is added to the manure to be treated.

8. Process according to claim 7, characterized in that there is added between 50 and 400% by weight of water with respect to the weight of manure to be treated.

9. Process according to claim 8, characterized in that part of the water added to the manure to be treated consists of the filtrate that is recycled.

10. Process according to claim 1, characterized in that the mixing is conducted with at least one stationary mixer before adding the sedimentation agent thereto.

11. Process according to claim 1, characterized in that the natural stone dust is selected from the group consisting of hornfels, syenite, shale, limestone and dolomite stones.

12. Process according to claim 1, characterized in that there is added between 0.5 and 15% by weight of sedimentation agent with respect to the weight of manure.

13. Process according to claim 1, characterized in that the liquid phase is filtered by membranous filtration.

14. Process according to claim 13, characterized in that the membranous filtration is followed by a filtration on activated carbon.

15. Process according to claim 1, comprising the addition of a sedimentation agent before aggregating the balls.

16. Process according to claim 2, characterized in that the binding agent is selected from the group consisting of lignosulfonate, bentonite, and sodium silicate.

* * * * *